S. SUNDERLAND.
GEAR CUTTING MACHINE.
APPLICATION FILED NOV. 27, 1914.

1,187,201.

Patented June 13, 1916.
6 SHEETS—SHEET 4.

Fig. 5.

Attest:
Ewd L. Tolson
Bessie I. Bishop

Inventor:
Sam Sunderland,
by Middleton Attys.

S. SUNDERLAND.
GEAR CUTTING MACHINE.
APPLICATION FILED NOV. 27, 1914.

1,187,201.

Patented June 13, 1916.
6 SHEETS—SHEET 5.

Attest:
Ewd L. Tolson
Bessie L. Bishop.

Inventor:
Sam Sunderland,
by Spear Middleton Donaldson Spear
Attys.

S. SUNDERLAND.
GEAR CUTTING MACHINE.
APPLICATION FILED NOV. 27, 1914.

1,187,201.

Patented June 13, 1916.
6 SHEETS—SHEET 6.

Attest:
Ewd L. Tolson
Bessie S. Bishop

Inventor:
Sam Sunderland,
by Spear Middleton Donaldson Spear
Attys.

UNITED STATES PATENT OFFICE.

SAM SUNDERLAND, OF KEIGHLEY, ENGLAND.

GEAR-CUTTING MACHINE.

1,187,201.           Specification of Letters Patent.     Patented June 13, 1916.

Application filed November 27, 1914. Serial No. 874,298.

*To all whom it may concern:*

Be it known that I, SAM SUNDERLAND, a subject of the King of Great Britain and Ireland, and resident of Lyndurst, High Utley, Keighley, in the county of York, England, have invented a certain new and useful Improvement Relating to Gear-Cutting Machines, of which the following is a specification.

This invention has for its object, the arrangement of mechanism combined and operated in such a manner that as the vertically movable headstock, carrying the reciprocating cutter arrives at the top of its vertical movement, the rotation of the wheel blank is stopped, and the reciprocation of the cutter stopped clear of said blank, the head stock supporting the cutter, is lowered the required distance, then restarted and caused to travel upward a sufficient distance, to remove any back lash from the gears. During the remainder of the upward movement of the head stock the reciprocating cutter is operated to act on the gear blank. The cutter slide is so arranged that the machine is applicable for cutting either spur or spiral toothed wheels.

In describing my invention in detail, reference is made to the accompanying sheets of drawings, on which—

Fig. 7, is a longitudinal sectional view of mechanism utilized for putting the wheel blank into and out of rotation. Fig. 11, is a detached detail of the circular nut and compound cam. Fig. 12, is a cross section through the compound cam looking in the direction of arrow, and Fig. 13, a detached view of a sliding claw clutch.

Figure 5:
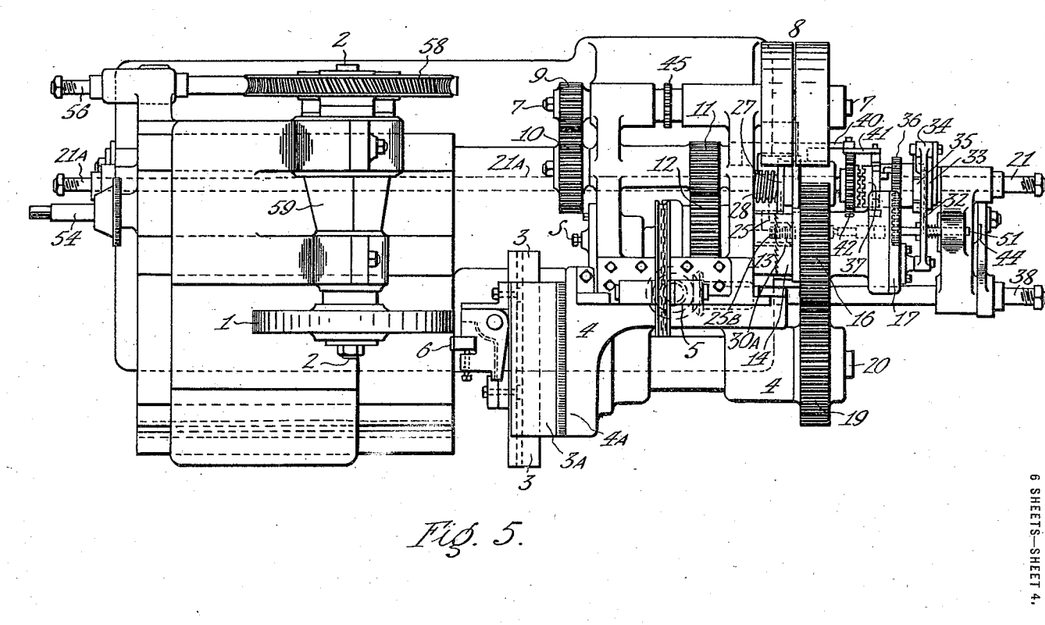
Fig. 5, a plan.

In carrying out my object, the wheel blank 1, see Fig. 5, is mounted upon a spindle 2, and rotated intermittently a distance equal to the pitch of the teeth being cut, during each series of cuttings.

The cutter slide 3 is mounted on the headstock 4, and reciprocated in the usual manner, the said headstock being counter-balanced and supported by a threaded bar 5, arranged to be rotated in both directions for the purpose of raising and lowering the headstock, reciprocating slide 3 and cutter 6 attached thereto. These are raised slowly in comparison with the downward movement, during which movement, the reciprocation of the slide 3 and cutter 6 are stopped in a position for the cutter to be clear of the wheel blank, which is also stationary, the stoppage being effected in the manner as hereinafter described.

Upon the shaft 7, are mounted pulleys 8, one of which is secured on said shaft and acts as driving pulley, the other pulley is free. To one end of said shaft is keyed a spur pinion 9 meshing with a spur wheel 10 keyed to a shaft upon which is also secured a spur wheel 11, meshing with a like wheel 12 keyed to a sleeve 12$^A$, freely mounted upon shaft 18, see Fig. 6.

Figure 6:
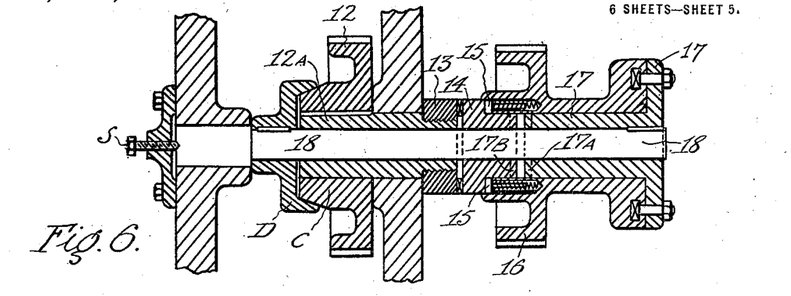
Fig. 6, a detached longitudinal sectional view drawn to a larger scale, showing the clutch mechanism by the engagement and disengagement of which, the cutter is reciprocated at intervals.

The spur wheel 12 is provided with a friction cone C, engaging with a friction cup D, keyed on the shaft 18, and with one end of this shaft a screw S engages, by the adjustment of which, cup D and cone C are held in frictional contact, sufficient for retaining said shaft in its forward or driving position, such as when the clutches 13 and 14 are in mesh.

Secured to the sleeve 12$^A$ is the toothed clutch 13, which is rotated continuously so long as the driving pulley is rotating.

Mounted freely upon shaft 18, is a sliding clutch 14, prepared at one end with suitable clutch teeth for engagement with like teeth cut in the face of the continuously rotating clutch 13. When clutch 14 is in its normal position, it is held in contact with the teeth on the face of clutch 13, by a series of spring operated plungers 15, mounted in suitable holes bored in the boss of spur wheel 16, secured to the flanged sleeve 17, keyed on shaft 18, said sleeve being provided at its inner end with a sliding coupling 17$^A$ of the ordinary description, adapted to engage with a like clutch 17ᴮ formed at the rear end of the sliding clutch 14, so that when the clutches 13 and 14 are in mesh, spur wheel 16, sleeve 17 and shaft 18 are rotated, and when out of mesh, the spur wheel, sleeve and shaft are stationary, and the reciprocation of cutter 6 stopped, as will be hereinafter described. The arrangement and construction of these parts will be clearly seen by reference to Figs. 6 and 13.

Meshing with the spur wheel 16, is a spur wheel 19 of equal diameter keyed upon shaft 20 (see Fig. 5), carried by the counter-balanced headstock 4, which is guided by suitable vertical guide ways, and adapted to reciprocate the cutter slide 3 in the usual well known manner, such as by means of a projecting crank pin engaging with a slot in the cutter slide, the said slide being supported by plate 3ᴬ, adapted to turn on the graduated flange 4ᴬ of headstock, to which it is secured at the desired angle in relation to the wheel blank 1, for cutting spur or spirally toothed gears; the counter-balanced headstock 4 being moved vertically in both directions, by the rotation of threaded bar 5, in the manner as hereinafter described.

Figure 1:
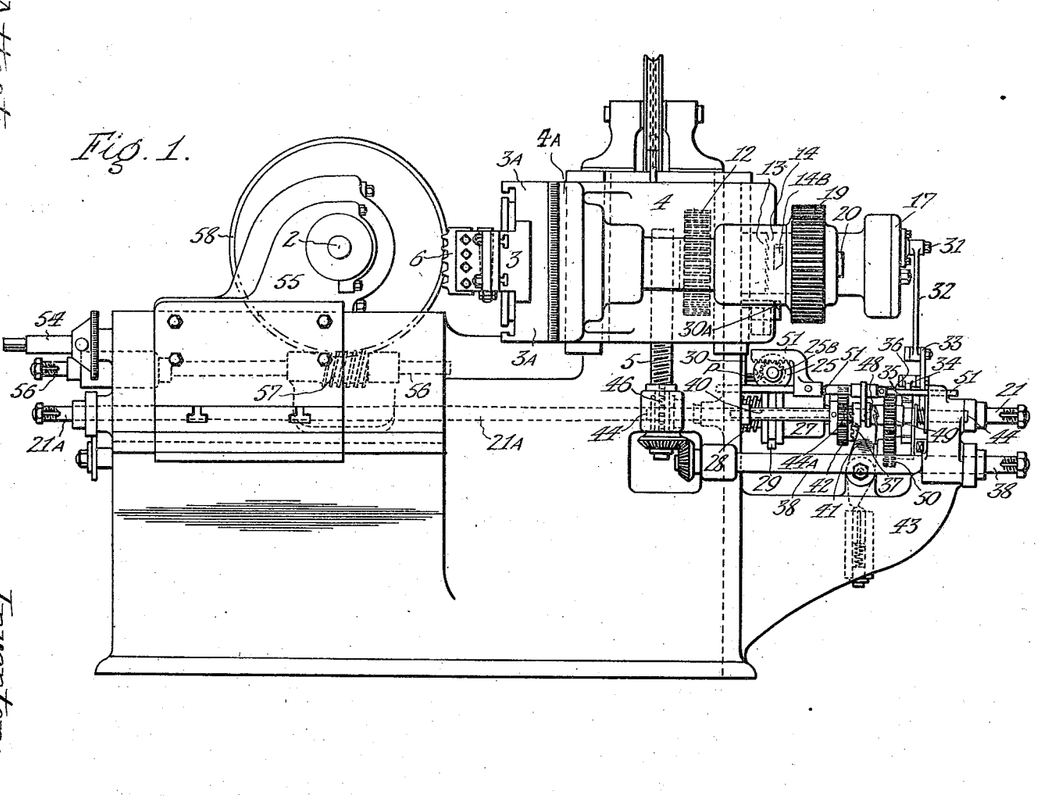
Figure 1, represents an elevation of my improved gear cutting machine.
Figures 7, 11, 12, 13:
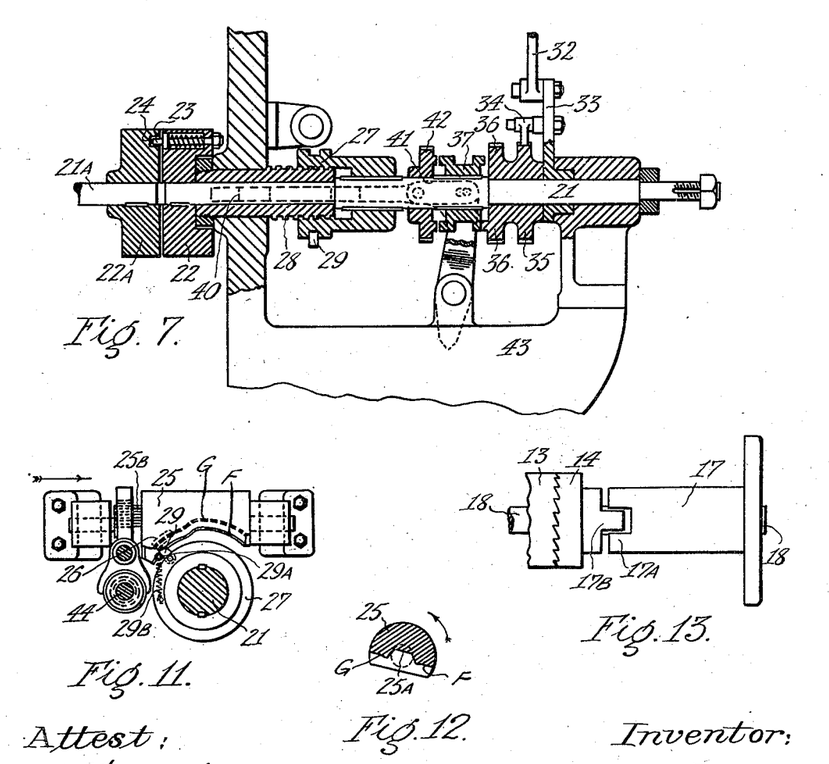

The shafts 21 and 21ᴬ, see Figs. 1 and 7, are in the same axial line, and so connected, that the shaft 21 may rotate in both directions, but shaft 21ᴬ, in one direction only. This is effected by securing a coupling boss 22, on one shaft, and a like boss 22ᴬ, on the other shaft, the boss 22 being provided with a yielding latch ended bar 23, inserted in a hole and pressed outward as shown, by a spiral spring under compression, into engagement with a hollow recess 24, cut in the other coupling boss 22ᴬ, the recess being by preference angular on one side. By these means, when shaft 21 is rotated in the direction for raising the headstock 4, the flat side of latch ended bar 23, is engaged with the flat side of recess 24, and shaft 21ᴬ caused to rotate; but as will be obvious, on shaft 21 rotating in the opposite direction, the angular side of bar 23 will engage with the angular side of recess 24, causing the bar 23 to be slid inward and thereby disengaged with said recess, leaving shaft 21ᴬ stationary.

Figures 9, 10:
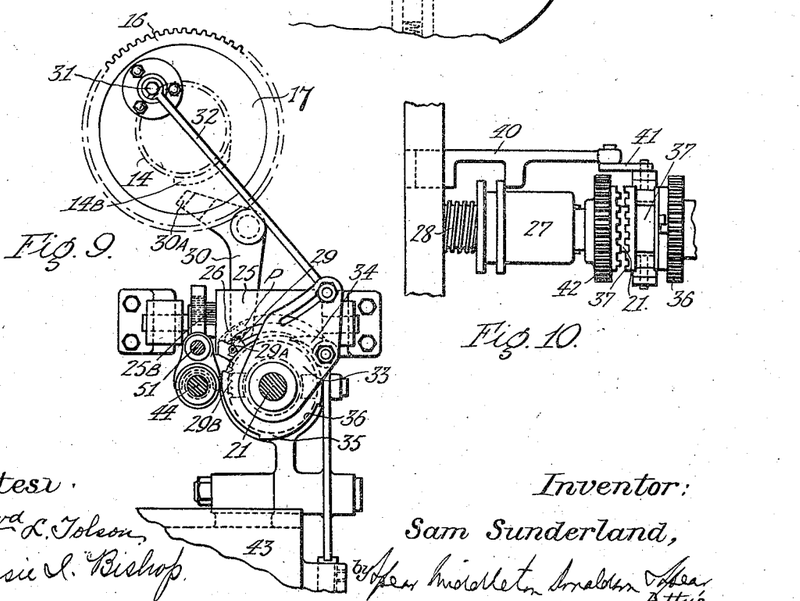
Fig. 9, is an end elevation of said mechanism partly in section.
Fig. 10, is a plan of the circular nut meshing with sliding bar and connection with sliding clutch.

Pivoted to the frame of the machine is a compound cam 25, see Figs. 9 and 11, the axis of said cam being at right angles to the axis of shaft 21, the cam being arranged with a clear space 25ᴬ, between each side of the circumference, as shown by sectional view Fig. 12.

Upon the shaft 21, is feather keyed a circular nut 27, meshing with a fixed threaded screw 28, so that as shaft 21 revolves in either direction, the circular nut is rotated, and caused to travel on said screw in accordance with the rotation of nut. This circular nut is flanged, and between the flanges, is pivoted a projection 29, of such length as to engage alternately with the surfaces F and G, of compound cam 25, the projection being so formed that it will yield on applying pressure on one side 29ᴬ, sufficient to overcome the tension of spring 29ᴮ, see Fig. 11. When the rigid side of projection 29 engages with the surface F of compound cam 25, the cam is turned in its journals in the direction of the curved arrow in Fig. 12 and by a pin P, see Fig. 8, projecting from the bottom end of pivoted lever 30, engaging with the spiral groove 26, cut in the circumference of compound cam, said lever is operated at right angles to the axis of the clutches 13 and 14 and the shaft 18, thereby removing the inclined surface 30ᴬ at the top of pivoted lever 30, clear of the projection 14ᴮ of clutch 14, thus allowing said clutch to mesh with the constantly rotating clutch 13, by which the cutter 6 and wheel blank 1, are put into operation. On the circular nut 27 arriving at the end of its travel toward the left in Figs. 1 and 10, that is what I term its forward movement, projection 29 will come in contact with the surface G of compound cam 25, and turn the cam in its journals in the direction opposite to that shown by the before mentioned curved arrow, by which the pivoted lever 30 engaging with the spiral groove 26 of compound cam is operated, and the inclined surface 30ᴬ, at the top of said lever, moved into the rotating path of the projection 14ᴮ of sliding clutch 14, causing said clutch to slide out of mesh with the clutch 13, thus stopping the rotation of spur wheels 16 and 19, and the reciprocation of cutter 6.

The operation of pivoted lever 30, and the reciprocation of cutter 6, are so timed and operated in relation to each other, that when the clutch 14 is slid out of mesh with the rotating clutch 13, the reciprocation of cutter 6, is stopped in a position that said cutter is clear of wheel blank 1.

Immediately before the stoppage of the reciprocating cutter 6, one of the flanges of circular nut 27 will have engaged with the recessed bar 40, sliding said bar in the direction for removing the sliding clutch 37 out of mesh with the spur wheel 36, into mesh with the spur wheel 42, both wheels freely mounted on shaft 21, by which means the rotation of shaft 21 is reversed, and the headstock 4 and cutter 6, lowered from the top of their vertical movement, a distance greater than the pitch of the teeth being cut in wheel blank.

Figure 2:
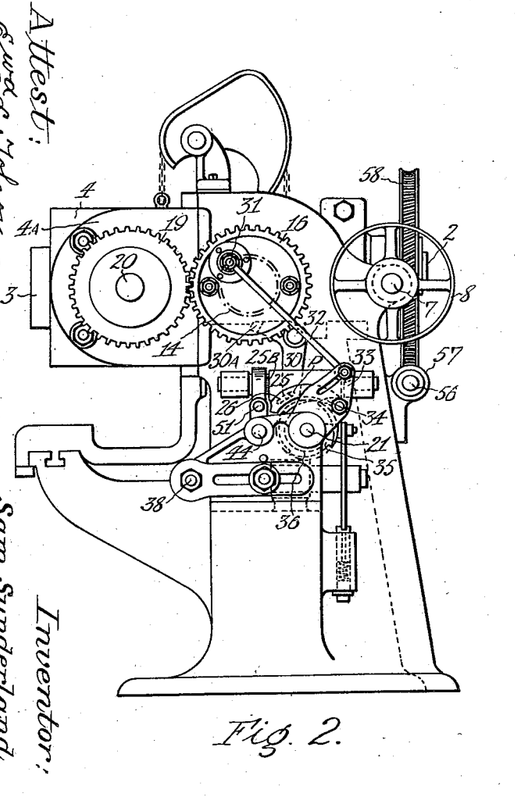
Fig. 2, is an elevation showing one end of the machine.
Figure 3:
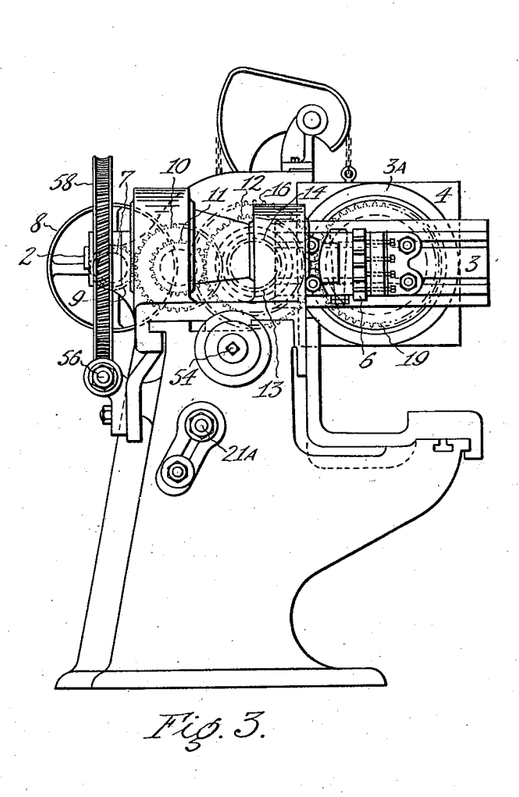
Fig. 3 is a view of the opposite end of machine.

On the circular nut 27 arriving at the end of its return or backward movement, it engages with the opposite end of recess in bar 40, as shown by Fig. 10, sliding said bar toward the right, and by its connection with lever 41, moving the sliding clutch 37 out of mesh with spur wheel 42, into mesh with the spur wheel 36, thus reversing the rotation of shaft 21, by which shaft 38, see Figs. 1 and 2, said shafts being connected by an ordinary train of change wheels of suitable diameters, not shown by the drawings, is also reversed and rotated in the direction for raising the headstock and cutter a sufficient distance to remove all back lash from the said wheels before the cutter 6 engages with the wheel blank, after which engagement, the cutter is reciprocated in contact with the wheel blank, and the raising continued a distance equal to the pitch of the teeth being cut in the wheel blank.

On the rotation of shaft 21 being reversed as last mentioned, that is, on commencing to cut the teeth in wheel blank, the pivoted projection 29 engages with the surface F of compound cam 25, turning it in its journals, and operating pivoted lever 30 for removing the inclined surface 30$^A$ clear of the projection 14$^B$, thus allowing clutch 14 to be slid into mesh with the revolving clutch 13, and renew the reciprocation of cutter 6.

Figure 4:
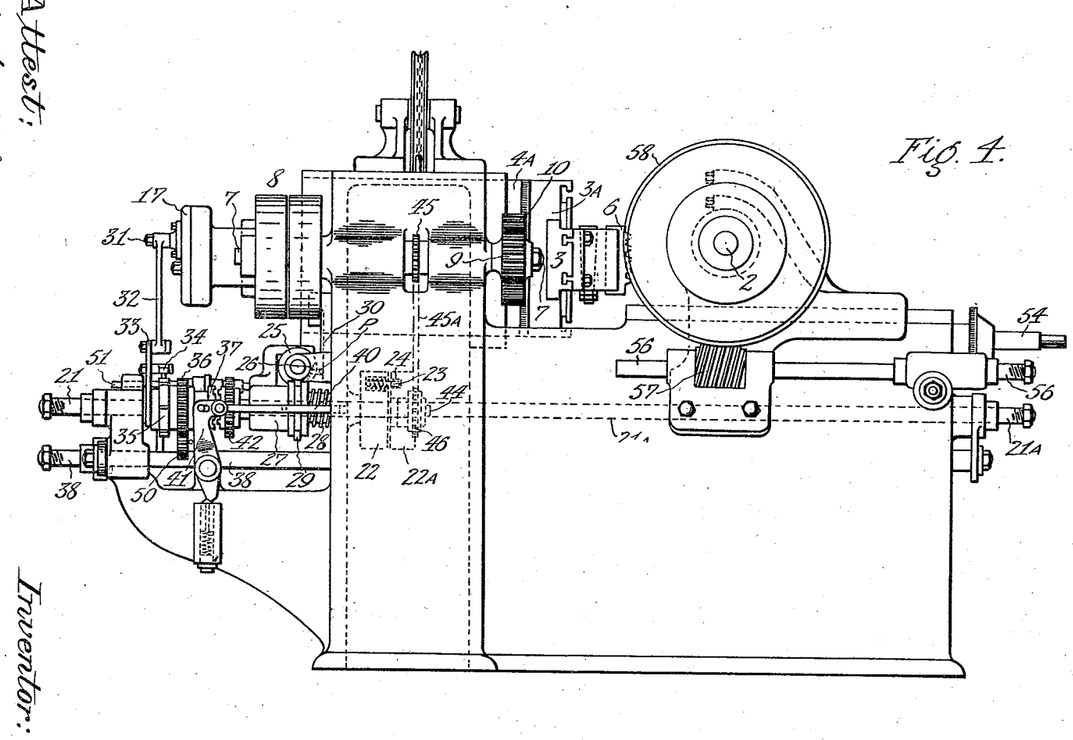
Fig. 4, is a back elevation.

The projecting bracket 43, in addition to carrying shaft 21, also carries shaft 44, driven in any convenient manner, such as by a sprocket wheel 45 keyed on shaft 7, see Figs. 4 and 5, the wheel carrying a chain 45$^A$, suitably guided and engaging with a like wheel 46, secured near one end of shaft 44, upon which is keyed a spur pinion 44$^A$ meshing with spur wheel 42, loosely mounted on shaft 21.

Figure 8:
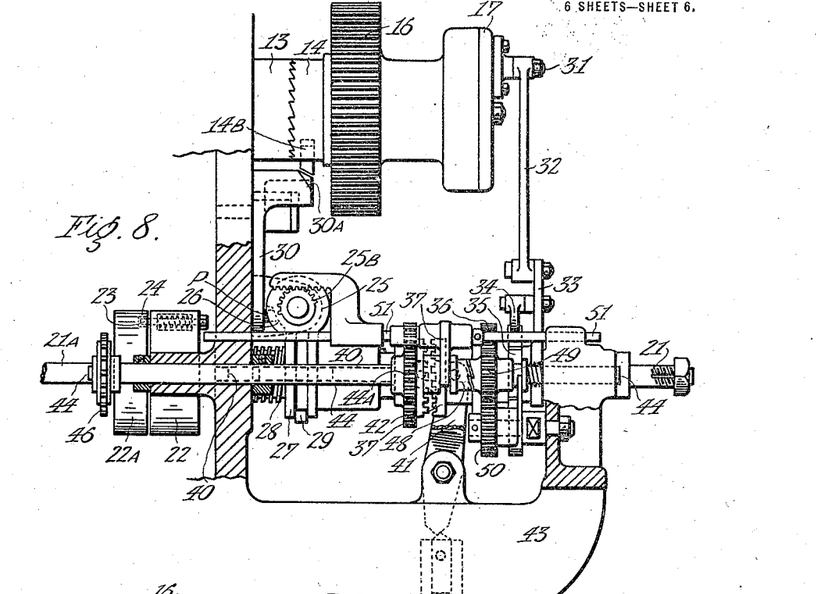
Fig. 8, is a front view of mechanism working in coöperation with that last named.

Upon shaft 44 is feather keyed a sliding clutch 48, and freely mounted upon this shaft is a spur pinion 49, prepared with clutch teeth on one side only as shown, the said pinion meshing with an intermediate spur wheel 50, in mesh with the before mentioned spur wheel 36, secured to ratchet wheel 35, freely mounted on shaft 21, see Fig. 8.

One of the ends of compound cam 25 is provided with a sectional pinion 25$^B$. When the cam is turned in the direction, opposite to that shown by the curved arrow in Fig. 12, by the engagement of projection 29 with the surface G of said cam, the sectional pinion 25$^B$ meshes with the toothed portion of bar 51 causing said bar to slide toward the right in Figs. 1 and 8 thereby causing the clutch teeth at 48 to mesh with the clutch teeth of pinion 49 and rotate same, giving rotary motion to spur wheel 50, and to spur wheel 36 meshing therewith, the latter as before mentioned being freely mounted on shaft 21 and integral with ratchet wheel 35.

When the projection 29 engages with the surface G as last mentioned, the sliding clutch 37, will by the operation of the recessed bar 40 and lever 41 attached thereto, be moved into mesh with spur wheel 42, causing the circular nut 27 to travel back, that is toward the right, and when near the end of its backward movement, the side 29$^A$ of said projection will engage with the surface F and yield on passing under same without affecting the position of compound cam.

Immediately the projection 29 is clear of surface F, the circular nut 27 will have slid the recessed bar 40 in the direction for causing the lever 41 to slide clutch 37 out of mesh with spur wheel 42, into mesh with spur wheel 36, which along with shaft 21, will be momentarily rotated by the pinion 49, through the intermediate spur wheel 50 in the forward direction, that is toward the left.

On the momentary rotation of shaft 21 as last mentioned, the rigid side of projection 29 is brought into contact with the surface F of compound cam 25, turning same in its journals and operating pivoted lever 30, thereby liberating the sliding clutch 14, allowing it to mesh with the rotating clutch 13 and put into motion spur wheel 16 and connections; the bar 51 at the same time is slid toward the left, removing the clutch teeth 48 out of mesh with the like teeth of pinion 49.

When the spur wheel 16 is put into rotary operation, the crank pin 31, connecting rod 32, pawl 34 and ratchet wheel 35 are put into motion, by which the rotation of shaft 21 is continued, moving circular nut 27 toward the left, until the compound cam 25 is again turned in its journals by the projection 29 engaging with the surface G, after which the cycle of mechanical movements is repeated.

The relation of the circumference of wheel blank 1, with respect to the reciprocating cutter 6, is controlled by the threaded shaft 54, engaging with a nut secured to the bracket 55, supporting the wheel blank in a convenient manner so that as will be obvious, on turning the threaded shaft, the wheel blank is adjusted to the position required.

The shaft 21$^A$ is as before mentioned rotated in one direction only, and is connected by an ordinary train of change wheels,— not shown by the drawings,—with shaft 56, the change wheels being of proportionate diameters for the purpose required.

Upon shaft 56, is feather keyed a worm 57, meshing with a worm wheel 58 secured to mandrel 59, adapted to support spindle 2. to which the wheel blank 1 is secured, so that during the rotation of shaft 21$^A$, worm wheel 58 and blank 1 are turned in a rotary direction, and the cutter 6 reciprocated in the manner as hereinafter described.

The operation of the machine is as follows: The wheel blank 1 is supported by bracket 55, adapted to slide on the machine bed, to suit the diameter of gear to be cut. Motion to the machine is derived from a pulley 8, rotating the spur wheels 9 to 12, the latter being keyed to a sleeve 12ᴬ, freely mounted on shaft 18, see Fig. 6. To one end of sleeve 12ᴬ is secured a clutch 13, and to the other end of said sleeve is keyed a spur wheel 12, provided with a friction cone C, engaging with a cup D, keyed on shaft 18, the shaft being capable of lateral adjustment by the regulation of screw S, by which sufficient friction is obtained for retaining said shaft in its forward or driving position such as when the clutches 13 and 14 are in mesh. When these clutches are in mesh, rotary motion is transmitted to the spur wheel 16, and through wheel 19 of the same diameter to the reciprocating cutter slide 3, to which cutter 6 is secured. Rotary motion is also given to the disk and crank pin 31, and by connecting rod 32, an oscillating motion is given to lever 33, provided with a pawl 34 engaging with a ratchet wheel 35 free on shaft 21, which is adapted to be rotated in both directions. When shaft 21 is rotated by the reciprocating pawl 34, engaging with the ratchet wheel 35, freely mounted on shaft 21, the feather keyed sliding clutch 37 is in mesh with the integral spur wheel 36 and by the shaft being geared with the shaft 38 in the ordinary well known manner, by a suitable train of change wheels not shown by the drawings, said shaft is rotated in the direction for raising to the height required, the counterbalanced headstock 4, for enabling the cutter 6 when reciprocated, to engage with and cut the teeth in wheel blank.

Feather keyed on shaft 21, is a circular nut 27 engaging with a fixed screw 28, said nut being flanged and provided with a projection 29. On the nut 27 arriving at the end of its forward movement, that is toward the left, and the projection 29 coming in contact with the surface G of compound cam 25, it is turned in the direction opposite to that shown by the curved arrow in Fig. 12, causing pivoted lever 30 to be actuated, and the inclined surface 30ᴬ of said lever to be moved into the rotating path of projection 14ᴮ, thereby sliding and stopping the rotation of clutch 14, and the reciprocation of cutter 6. The reciprocation of cutter 6 in relation to the sliding of clutch 114 by the operation of pivoted lever 30, is so timed and adjusted, that when the rotation of said clutch is stopped, the reciprocation of the cutter is stopped clear of the wheel blank. On the engagement of projection 29 with the surface G of compound cam 25, the bar 51 is slid toward the right, and at the same time the rotation of shaft 21 is reversed. This is effected by the engagement of circular nut 27 with the recessed sliding bar 40, which is connected with lever 41, on the sliding of said bar, clutch 37 is moved out of mesh with wheel 36, into mesh with wheel 42, the said wheel gearing with spur pinion 44ᴬ on shaft 44, rotates shaft 21 in the opposite direction to that when cutting the teeth. The reversal of rotation of shaft 21, causes the circular nut 27 to travel toward the right, and when near the end of its travel, the surface 29ᴬ of pivoted projection 29, engages with the surface F of compound cam, the projection yielding on passing under said surface without operating the cam. Immediately the projection is clear of surface F, the rotation of shaft 21 is reversed and the clutch 37 slid into mesh with wheel 36, allowing the positive or rigid surface of the projection 29 to engage with the surface F, and turn compound cam 25 in its journals, thereby operating pivoted lever 30, and moving the inclined surface 30ᴬ, clear of the projection 14ᴮ, allowing clutch 14 to mesh with revolving clutch 13, and the cutting operation to be resumed. On the turning of compound cam in its journals, bar 51 is slid toward the left, and the clutch teeth 48 moved out of mesh with the teeth of pinion 49, circular nut 27 is also moved toward the left, and when the projection 29 engages with surface G of compound cam. it is turned in its journals, when the cycle of operations is repeated. The shaft 21 is in the same axial line as shaft 21ᴬ and is rotated by a latch ended bar 23 mounted in block 22 secured to shaft 21, the latch end of bar engaging with an angular recess cut in the block 22ᴬ, secured to shaft 21ᴬ, the bar causing shaft 21ᴬ to rotate when the flat side of 23 forms the driver, but on the angular side of bar forming the driver, the bar recedes, leaving shaft 21ᴬ stationary, and the geared connections between said shaft and worm wheel 58, mandrel 59, and wheel blank also stationary.

What I claim is.

1. A gear cutting machine comprising in combination a vertically movable headstock, a reciprocating cutter carried thereon, a rotating spindle adapted to carry a gear blank, a main drive shaft, a shaft adapted to rotate in both directions coupled thereto, mechanism for raising and lowering said head-stock, means for rotating said gear blank spindle and means for reciprocating said cutter, operating means connecting said shaft with the head-stock raising and lowering mechanism, with the spindle rotating means and with the reciprocating cutter means, respectively, for controlling the movements of said parts.

2. A gear cutting machine comprising in combination a vertically movable headstock, a reciprocating cutter carried thereon, a rotatable gear blank spindle, a drive shaft and a shaft adapted to rotate in both directions, means for connecting said shaft with the drive shaft and separate means controlled by the reversible shaft for operating said vertical head-stock, said rotatable spindle and said reciprocating cutter respectively in proper sequence.

3. A gear cutting machine comprising in combination a vertically movable head-stock, a rotating gear blank spindle on said machine, a main drive shaft, a second shaft adapted to rotate in both directions, means adapted to connect said drive shaft and said second shaft, separate operating means connecting said second shaft with the vertically movable head-stock, and rotating spindle respectively, and means carried on the machine frame adapted to automatically control the direction of rotation of said second shaft and the sequence of operation of the respective parts.

4. A gear cutting machine comprising in combination a vertically movable head-stock, a reciprocating cutter carried thereon, a rotating gear blank spindle, a main drive shaft, a second shaft adapted to rotate in both directions, means for connecting said drive shaft and said second shaft, means for automatically reversing the direction of said second shaft, means associated with said second shaft for raising said vertical head-stock and means for simultaneously operating said reciprocating cutter and rotating said gear blank spindle, means for stopping the movements of said head-stock, reciprocating cutter and gear blank spindles respectively upon the reversal of said second shaft, means for operating said head-stock while the reciprocating cutter and gear blank spindle remain stationary, and further means for causing said second shaft to resume rotation in its original direction, the head-stock to resume its upward movement, the reciprocating cutter to resume its operation and the gear blank spindle to continue its rotation.

5. A gear cutting machine comprising in combination a vertically movable head-stock, a reciprocating cutter carried thereon, a rotating gear blank spindle, a main drive shaft, a second shaft adapted to rotate in both directions, means for connecting said drive shaft and said second shaft, separate operating means connecting said second shaft with the vertically movable head-stock, rotating spindle and reciprocating cutter respectively, and a compound cam mounted on the machine in operative relation to said second shaft for controlling the direction of rotation of said shaft and the resulting sequence of operation of the several parts.

In witness whereof I have hereunto set my hand to this specification in the presence of two witnesses.

SAM SUNDERLAND.

Witnesses:
 JOHN GILL,
 RALPH TOPHAM.